United States Patent [19]
Velke et al.

[11] Patent Number: 6,155,034
[45] Date of Patent: Dec. 5, 2000

[54] PIVOTING GRASS CATCHER ATTACHMENT TO SELF-PROPELLED POWER MOWER

[75] Inventors: James D. Velke, Germantown; William D. Patton, Gaithersburg, both of Md.

[73] Assignee: Wright Manufacturing, Inc., Gaithersburg, Md.

[21] Appl. No.: 09/501,236

[22] Filed: Feb. 10, 2000

Related U.S. Application Data

[63] Continuation of application No. 09/054,472, Apr. 3, 1998, Pat. No. 6,044,634.

[51] Int. Cl.$^7$ .............................. B62D 11/04; A01D 69/00
[52] U.S. Cl. .............................. 56/16.6; 56/16.8; 56/202; 56/320.2
[58] Field of Search ................................ 56/2, 16.6, 16.7, 56/16.8, 194, 202, 320.1, 320.2, DIG. 9

[56] References Cited

U.S. PATENT DOCUMENTS

| | | |
|---|---|---|
| 2,970,421 | 2/1961 | Krewson .................................. 56/202 |
| 3,099,123 | 7/1963 | Price ........................................ 56/202 |
| 3,112,597 | 12/1963 | Heth et al. ............................... 56/202 |
| 3,553,947 | 1/1971 | Root ........................................ 56/202 |
| 3,579,966 | 5/1971 | Allina . |
| 3,662,527 | 5/1972 | Breckenridge, Jr. . |
| 3,778,986 | 12/1973 | Wright et al. . |
| 3,805,499 | 4/1974 | Woelffer et al. ......................... 56/202 |
| 3,820,313 | 6/1974 | Hoffmann . |
| 3,962,852 | 6/1976 | Boyer ...................................... 56/202 |
| 4,149,363 | 4/1979 | Woelffer et al. . |
| 4,217,747 | 8/1980 | Brown . |
| 4,251,982 | 2/1981 | Skaja et al. ............................. 56/202 |
| 4,312,176 | 1/1982 | Bollinger et al. ....................... 56/202 |
| 4,598,536 | 7/1986 | Langley . |
| 4,800,712 | 1/1989 | Morse et al. . |
| 4,936,083 | 6/1990 | Deutsch . |
| 4,984,419 | 1/1991 | Sampei et al. . |
| 5,457,946 | 10/1995 | Deitrick ................................. 56/16.6 |
| 5,845,473 | 12/1998 | Hopkins et al. ........................ 56/202 |
| 5,984,031 | 11/1999 | Velke et al. ............................ 180/6.48 |

OTHER PUBLICATIONS

Ransomes Versadeck Mid–Size Models: 933002, 934002, 935002, Nov. 1993 (45 pgs)

*Primary Examiner*—Eileen D. Lillis
*Assistant Examiner*—Gary S. Hartmann
*Attorney, Agent, or Firm*—Nixon & Vanderhye P.C.

[57] ABSTRACT

A grass catcher for attachment to a power mower. In certain embodiments, the grass catcher is mounted to a self-propelled power mower so that the catcher is pivotable about two substantially perpendicular axes simultaneously.

1 Claim, 2 Drawing Sheets

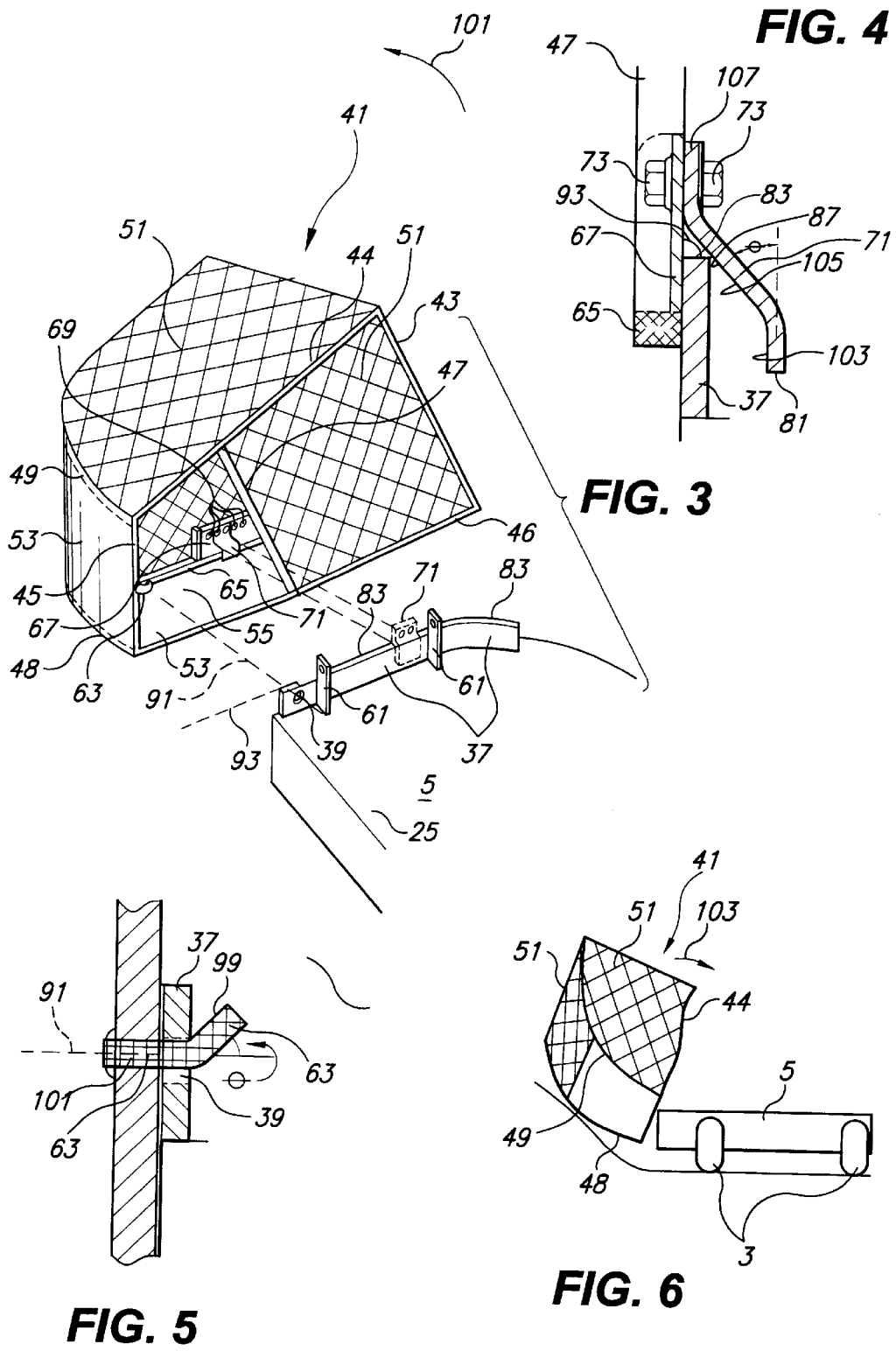

PIVOTING GRASS CATCHER ATTACHMENT TO SELF-PROPELLED POWER MOWER

This is a continuation of application Ser. No. 09/054,472, filed Apr. 3, 1998, now U.S. Pat. No. 6,044,634, the entire content of which is hereby incorporated by reference in this application.

This application relates to a grass catcher for attachment to a lawn mower. More particularly, this invention relates to a side-mountable grass catcher pivotally attachable to a self-propelled mower so that in certain embodiments there is no need to mount an additional support bracket to a cutter deck adjacent the grass discharge opening.

BACKGROUND OF THE INVENTION

Grass catchers for attachment to self-propelled commercial walk-behind power mowers are known in the art. Typically, grass catchers have been designed so that they can only be attached to the mower adjacent a side grass discharge opening when an additional support bracket is affixed to the cutter deck. The need to attach additional bracketry to the mower is undesirable and burdensome. Still further, certain prior art catchers and mowers are designed such that the catcher can only be attached to the cutter deck of a mower if the chute deflector is removed from the mower.

It is apparent from the above that there exists a need in the art for a grass catcher which is designed in a manner such that for certain types of walk-behind mowers, there is no need to provide additional bracketry prior to grass catcher attachment. In alternative embodiments, such a catcher can also be mounted to the side of stand-on zero turning mowers. There is also a need in the art for a grass catcher design which when utilized with certain types of mowers eliminates the need to remove a chute deflector prior to grass catcher attachment.

This invention will now be described with respect to certain embodiments thereof, accompanied by certain illustrations.

SUMMARY OF THE INVENTION

Generally speaking, this invention fulfills the above-described needs in the art by providing a system for mounting a grass catcher to a self-propelled power mower including a cutter deck, the system comprising:

the cutter deck including a side discharge opening defined therein through which grass cut by the mower is thrown;

a support member extending upwardly from a plane of the cutter deck, the support member including first and second sidewalls and a top;

said support member including a mounting aperture defined therein;

the grass catcher including a male mounting member and a ramp member, the male mounting member fitting into the mounting aperture defined in the support member and the ramp member engaging a portion of the support member when the grass catcher is mounted on the mower; and wherein the grass catcher includes a grass input opening defined therein for allowing grass to enter the catcher from the side discharge opening when the catcher is mounted on the mower.

This invention further fulfills the above-described needs in the art by providing a grass catcher comprising:

a frame including a plurality of elongated members;

material disposed between elongated members of the frame for at least partially enclosing an interior of the catcher, the interior for holding grass that is output through a grass discharge opening;

an elongated male pin for insertion into an aperture defined in a portion of the mower, the elongated male pin including at least first and second portions which are angled relative to one another, with the first portion extending substantially perpendicular to a side of the catcher from which it projects;

a latch affixed to the catcher, the latch including at least a first portion and a second portion which are connected and angled relative to one another, the first portion be oriented substantially parallel to said side of the catcher and the second portion having an underneath surface for resting upon a support of the mower when the catcher is mounted on the mower.

This invention will now be described with respect to certain embodiments thereof, along with reference to the accompanying illustrations.

IN THE DRAWINGS

FIG. 3 is an exploded perspective view of a grass catcher which is attachable to a corresponding cutter deck of a self-propelled power mower according to an embodiment of this invention.

FIG. 4 is a cross-sectional view illustrating the securing ramp (or latch) of the FIG. 3 grass catcher extending over top of a support bar provided on top of the mower's cutter deck, in accordance with the FIG. 3 embodiment of this invention.

FIG. 5 is a cross-sectional view of the angled pivot pin of the FIG. 3 grass catcher extending through an aperture defined in the corresponding support member which is affixed to the top of the cutter deck in accordance with the FIGS. 3–4 embodiment of this invention.

FIG. 6 is a front elevation view illustrating the cutter deck and corresponding catcher in accordance with the FIGS. 3–5 embodiment of this invention, wherein the catcher is being pivoted upward due to catcher contact with the ground thereby preventing scalping of turf.

DETAILED DESCRIPTION OF CERTAIN EMBODIMENTS OF THIS INVENTION

Figure 1:
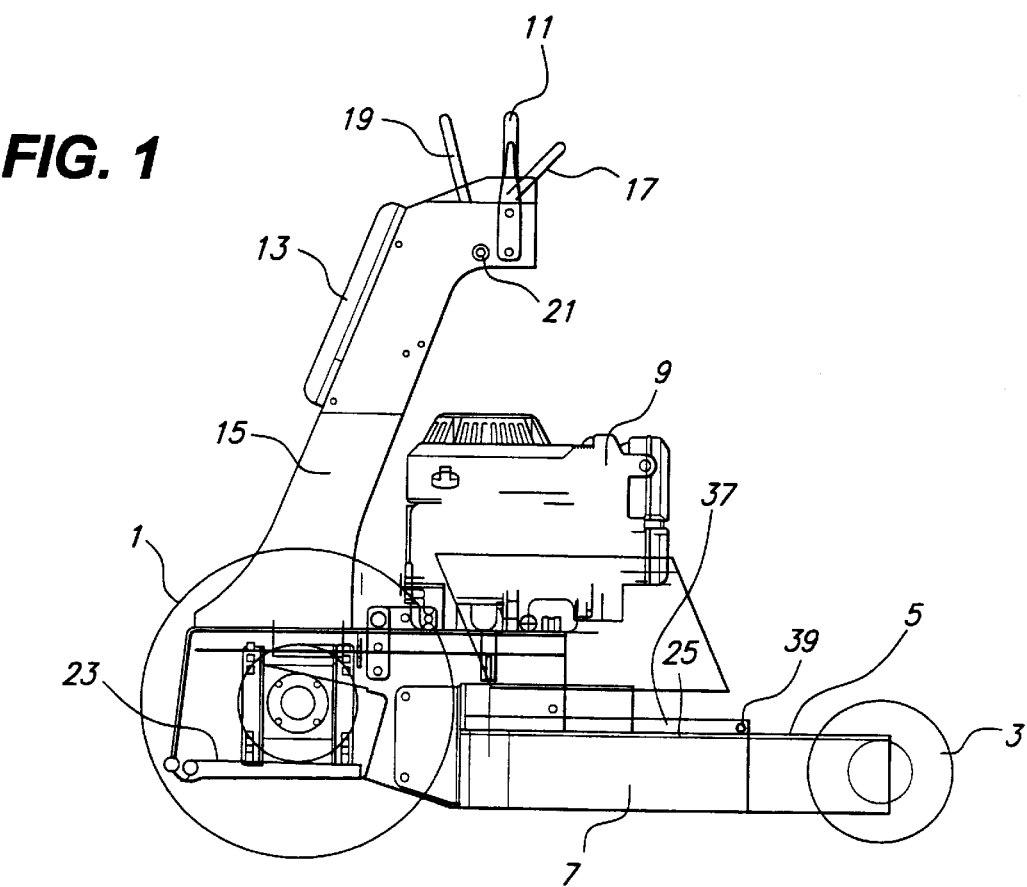
FIG. 1 is a side elevation view of a self-propelled power mower, without a grass catcher attached thereto.

Referring now more particularly to the accompanying drawings in which like reference numerals indicate like parts throughout the several views.

FIG. 1 is a side plan view of a self-propelled stand-on zero radius turning power lawn mower to which a grass catcher in accordance with certain embodiments of this invention may be attached. The FIG. 1 mower includes a pair of rear independently driveable wheels 1, a pair of front pivotal caster wheels 3, cutter deck 5, side grass discharge opening 7 defined at a side of cutter deck 5, engine 9, rigid handle bar member 11, thigh pad 13, support member 15, reverse handle control member 17, forward handle control member 19, and pivot axis 21 about which members 17 and 19 may pivot. The FIG. 1 mower may be a stand-on mower as illustrated including foot platform 23 for supporting a standing occupant, or alternatively in other embodiments may be a walk-behind self-propelled mower as known in the art.

Figure 2:
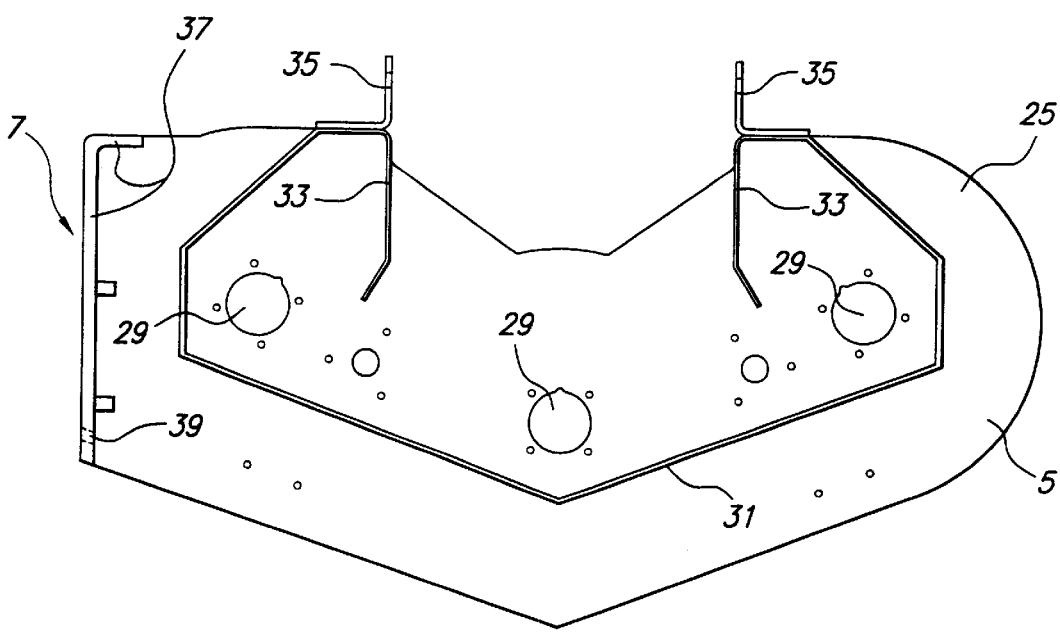
FIG. 2 is a top view of the cutter deck of the FIG. 1 mower, the FIG. 2 cutter deck adapted to receive a grass catcher according to an embodiment of this invention.

FIG. 2 is a top view of cutter deck 5 of the FIG. 1 mower. As illustrated, cutter deck 5 includes planer surface 25 below which are mounted a plurality of cutting blades (not shown). Apertures 29 are provided in the plane of cutter deck 5 so that driving spindle members (not shown) can extend downwardly from pulleys in order to drive the cutting blades. Cutter deck 5 further includes vertically extending support wall 31 which partially closes off the belt area, and corresponding support walls 33. A cover (not shown) may be mounted on top of walls 31 and 33 to enclose the belt area. The cutter deck 5 may be attached to the other portion of the mower assembly by way of support members 35.

Still referring to the FIG. 2 cutter deck, grass discharge opening 7 is defined in a side thereof. Located at an edge of top plane 25 of cutter deck 5 immediately adjacent and above grass discharge opening 7 is vertically extending rigid metal support member 37. Support member 37 is provided with grass catcher mounting aperture 39 defined therein, and chute attachment members 61 are located proximate member 37.

Referring now to FIGS. 2–6, it will be explained how grass catcher 41 is designed and how the catcher is affixed to the mower adjacent side discharge opening 7. As illustrated in FIG. 3, grass catcher 41 includes a frame portion made up of elongated rigid members 43–49 and 65. Elongated members 43–49 and 65 may be welded together at corner or junction areas according to certain embodiments of this invention, with each member 43–49 and 65 being made up of hollow metal tubing. Members 43–49, may each be independent and distinct members welded together or alternatively the entire frame may be made up of one, two, three, or four integrally formed pieces. Screen or mesh 51 is provided between the frame members so that catcher 41 can hold grass which is thrown or blown thereinto. According to certain embodiments of this invention, sheet metal 53 is formed adjacent opening 55 in the grass catcher, with sheet metal 53 being present in areas of the catcher which are exposed to direct impact of incoming grass. When catcher 41 becomes full of grass, its may removed from the mower and emptied as will be described below. Grass catcher 41 is designed so that opening 55 defined therein is mounted proximate or immediately adjacent grass discharge opening 7 so that grass cut by the mower can be blown out of the cutter deck through opening 7 and into grass catcher 41 through input opening 55. In certain embodiments, sheet metal 53 and screen or mesh 51 may be made of appropriately formed 22 gauge steel sheet, or the like. Other materials may of course suffice, depending upon the application or cost of the catcher. Also, in certain embodiments, frame members 43–49 and 65 may be made up of, for example, ⅝" square steel or metal tubing.

Typically, certain mower cutter decks 5 are provided with a vertically extending elongated wall or support member 37 as illustrated in FIGS. 2–4. Vertical deflection chute mounting members 61 may also be provided. An aperture or hole(s) 39 is defined in each support member 37 near the front (or rear in certain embodiments) of the grass discharge opening 7. Aperture 39 is adapted to receive elongated angled pin or angled projection member 63 provided on catcher 41 (see FIGS. 3 and 5).

When grass catcher 41 is mounted to cutter deck 5 by way of bent or angled pin 63 being provided in mounting aperture 39, the pin 63 and/or aperture 39 represent(s) a pivot axis about which catcher 41 can pivot as illustrated in FIG. 6.

Such pivoting is useful in mounting the catcher on the mower, removing the catcher from the mower, and in enabling the catcher to float or change positions during mower operation so as to prevent grass scalping. For example, as shown in FIG. 6, when the mower runs over bumpy or hilly terrain which contacts the bottom of grass catcher 41, the catcher is permitted to pivot upward about the pivot axis defined by pin 63 and/or aperture 39 so as to avoid scalping of grass. This pivot axis is defined by an axis extending through mounting aperture 39.

Grass catcher 41 includes rigid elongated horizontal support member or bar 65 which extends between and is connected to substantially vertically +/−30 degrees oriented frame members 45 and 47. Ramp support bracket 67 is mounted to elongated support member 65, e.g. on a major surface thereof, as illustrated in FIGS. 3–4. Bracket 67 includes a substantially planar major surface which faces the cutter deck and has a plurality, or row, of mounting apertures 69 defined therein for the purpose of enabling ramp or latch member 71 to be mounted to bracket 67 at different select locations. Because two mounting apertures are defined in ramp 71, the ramp may be affixed to bracket 67 at a plurality of different locations thereon (i.e. using any two mounting apertures 69). Thus, the position of ramp 71 on bracket 67 may be adjusted depending on the type of lawn mower to which catcher 41 is to be attached.

As illustrated in FIG. 4, ramp or latch 71 is attached to bracket 67 by way of a fastener 73 such as a nut and corresponding bolt. Two such fasteners 73 are utilized in view of the two independent mounting holes provided in ramp 71 for mounting. Furthermore, as illustrated in FIG. 4, ramp 71 includes three separate integrally formed portions, namely flat portion 107 for mounting to bracket 67, flat portion 103 for keeping the ramp from slipping over wall 37 during mower operation, and angled portion 71 which connects portions 103 and 107 to one another. Of course, ramp 71 may be in the form of other shapes. For example, ramp (or latch) 71 may be substantially z-shaped, curved, substantially stair-shaped, or the like.

The plurality of apertures 69 enable the catcher to be adjustable to fit a number of different commercially available mowers, such as known Bobcat 36", 48", and/or 52" walk-behinds, and known Exmark 36", 48", and 52" walk-behinds.

When it is desired to mount grass catcher 41 on cutter deck 5, an operator first manipulates the catcher so that angled pin 63 is caused to be inserted into and through aperture 39. Then, the operator pivots grass catcher 41 upwardly about the pivot axis defined by pin 63 in aperture 39 until bottom edge 81 of ramp 71 can fit over top of top edge 83 of support 37. Then, grass catcher 41 is pivoted about a vertical axis proximate the front of the mower deck so as to be pressed closely adjacent grass discharge opening 7 in deck 5 so that ramp 71 extends over top of support 37. Then, the grass catcher 41 is dropped, or pivoted downward about the axis defined by pin 63 in aperture 39 so that the underneath or bottom surface 87 of ramp 71 comes to rest on part (e.g. corner) of the top edge 83 of support 37 as shown in FIG. 4. When this is done, grass catcher 41 is properly mounted on the mower via angled pin 63 in hole 39, and ramp or latch 71 which maintains the catcher on is the mower. Both the angled portion of pin 63 and ramp 71 keep the catcher from falling off of the mower.

Catcher 41 and the corresponding structure illustrated in FIGS. 3–6 are designed so that, during mower operation and during catcher attachment/removal, catcher 41 can pivot about first and second pivot axes which are substantially perpendicular to one another. The first such pivot axis 91 (see FIGS. 3 and 5) is defined by a portion of pin 63 protruding through aperture 39. Although the center line of pivot axis 91 may be adjusted during operation due to the loose fit of pin or projection 63 relative to the surrounding inner diameter of aperture 39, axis 91 typically remains substantially parallel ±20° to the ground which may be considered horizontally aligned, and axis 91 extends through aperture 39 at some point. The second pivot axis 93 about which the catcher can pivot during mower operation is substantially perpendicular to axis 91, and is defined adjacent top edge 83 of support 37 as shown in FIGS. 3–4. Because of the way in which ramp 71 fits over top 83 of support or wall 37 as shown in FIG. 4, the catcher may pivot about axis 93 so that the portion of the catcher above the cutter deck and closest to the mower pivots inwardly toward the mower's engine as illustrated in FIG. 6. Thus, for example, when the bottom of catcher 41 contacts the ground as shown in FIG. 6, the bulk of the catcher can simultaneously pivot upwardly 101 about axis 91 and inwardly 103 toward the mower about axis 93. Bend or angled portion 99 of male member or pin 63 keeps the catcher mounted to the deck 5 during such pivoting. Bend 99 typically defines an angle θ relative to straight portion 101 of pin 63 of from about 20°–70°, preferably from about 30°–55°.

Catcher 41 is installed and removed from the mower by pivoting the catcher about both axis 91 and axis 93. Such dual pivoting is unlikely to occur during operation of the mower. Thus, catcher 41 is designed so as to be easily installed and easily removed from the mower, yet prevent unwanted detachment of the catcher during mower operation. Substantially flat portion 103 of ramp 71 is provided to keep the catcher from sliding off of the mower at the end of the ramp, while angled portion 105 of ramp member 71 maintains the catcher tightly against the side of deck 5 adjacent the grass discharge opening and allows the catcher to pivot about axis 93 during mower operation. Flat portion 103 typically defines an angle θ relative to angled portion 105 of from about 30°–60°, and preferably from about 35°–50°. Angled portion 105 of ramp 71 further is integrally formed with flat portion 107, with flat portions 103 and 107 being substantially parallel to one another in certain embodiments of this invention.

It is noted that vertically extending support member 37 is provided immediately adjacent, or at least closely adjacent the edge of deck 5 proximate the grass discharge opening. This enables the catcher, via ramp 71 and pin 63, to be held flush or closely provided adjacent the grass discharge opening of deck 5 so that substantially all grass cut by the mower and thrown through opening 7 is received within the interior of catcher 41. The design of the mower also permits the catcher, when pivoted upward about axis 91 or inward about axis 93 during mower operation, to be biased back toward the fundamental resting attached position shown in FIG. 4.

For mowers which do not have a support member 37, it is within the purview of this invention to anticipate that owners or dealers of such mowers may add a support member similar to member 37 shown herein, so that grass catcher 41 can be attached to the mower via a ramp or latch 71 and male member 63.

Furthermore, with certain mowers, in view of the catcher design described herein, it is unnecessary to remove the plastic or rubber pivoting chute deflector which is typically provided adjacent the grass discharge opening. This chute deflector is typically affixed to the mower via apertures defined in vertical members 61. For example, such a chute is described and illustrated in commonly owned pending U.S. Ser. No. 08/972,395, filed on Nov. 18, 1997, the entire disclosure of which is incorporated herein by reference. Also, if a particular mower does not have aperture 39 defined therein when purchased, then it is anticipated that a user could drill such a hole 39 in a support member 37 so as to enable the mower to accept mounting of catcher 41.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A grass catcher to be mounted to a side grass discharge opening of a self-propelled lawn mower, the grass catcher comprising:

a frame;

a cavity at least partially defined by the frame and at least partially enclosed for holding grass that is output through the side grass discharge opening;

an elongated projection for insertion into an aperture defined in the mower;

a latch affixed to the catcher, the latch including at least a first portion and a second ramp portion which are connected to one another so as to define an angle of from about 30–60 degrees therebetween, the second ramp portion having a surface for resting upon a support of the mower when the catcher is mounted on the mower; and wherein said projection and said latch enable the catcher to simultaneously pivot about first and second different axes during mower operation, wherein said first and second axes are approximately perpendicular to one another.

* * * * *